Feb. 20, 1940.   E. D. TILLYER   2,191,047
METHOD AND MEANS FOR TESTING THE EYES
Filed April 12, 1937
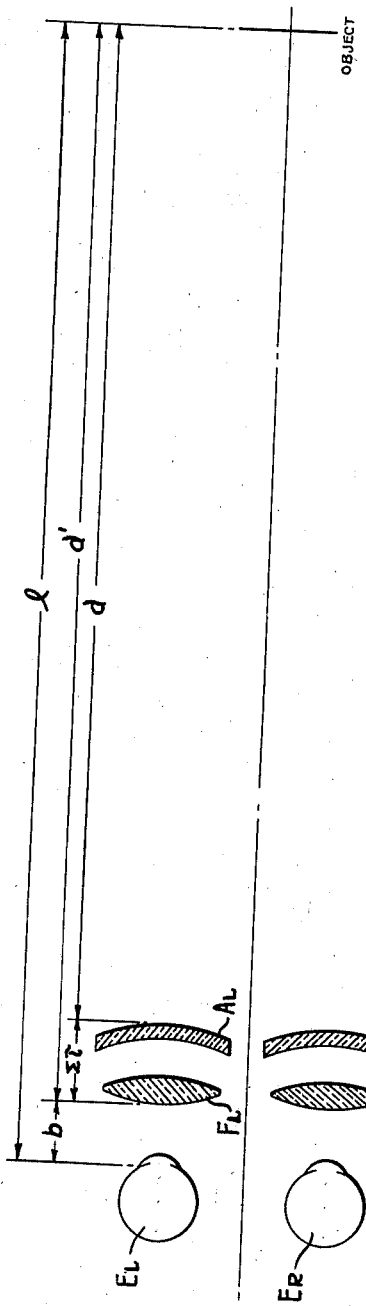
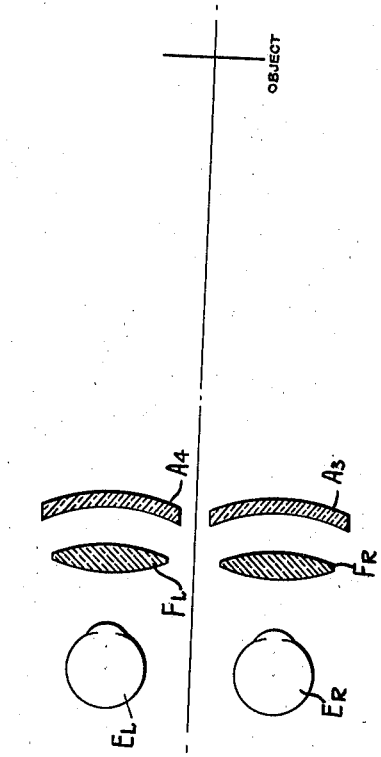
INVENTOR
EDGAR D. TILLYER
BY
Harry H. Styll.
ATTORNEY Patented Feb. 20, 1940

2,191,047

UNITED STATES PATENT OFFICE 2,191,047

METHOD AND MEANS FOR TESTING THE EYES

Edgar D. Tillyer, Southbridge, Mass., assignor to American Optical Company, Southbridge, Mass., a voluntary association of Massachusetts Application April 12, 1937, Serial No. 136,268

4 Claims. (Cl. 88—20)

The present invention relates to the determination of the size correction which should be placed in ophthalmic lenses in order to equalize the mental impressions of size in the two eyes (such impressions being also referred to in the art as ocular images). This determination is dealt with in the present application both from the point of view of the proper lenses to be used as test lenses and from the point of view of the technique for designing the ophthalmic lenses in accordance with the results of these tests.

Accordingly, one object of my invention is to provide a set of test lenses having improved characteristics for the above purpose.

Another object of my invention is to improve and simplify the practice to be followed in determining such size corrections.

According to the customary method now in use for determining such size correction for a patient, the tests are made in conjunction with tests to determine what focal power, if any, the ophthalmic lenses for the patient should have for correct vision; and the tests for size are carried out while the power lenses before the patient's eyes are the correct ones for his vision at the distance used in the test. The customary method requires two sets of size lenses for the tests for size; and while both sets are used with the same type of power lenses, one set of size lenses is required for determining the size correction for distance vision and the other set is required for determining the size correction for near vision.

I have discovered that but one set of size test lenses is required. I find that if a given set of size test lenses designed for distance is employed not only in the tests for determining the size correction for distance vision but also in the tests for determining the size correction for near vision, not only are the corrections resulting from these tests applicable (as was to be expected) to the designing of the surface curvatures for the distance lenses but also to the designing of the surface curvatures for the near lenses, provided in such designing of the prescription lenses for near vision the correction for size is applied as if they were distance lenses. There are certain precautions to be taken, but these will appear as the mathematical basis for my novel procedure for determining these size corrections is worked out.

It will be helpful to an understanding of the invention to consider at this point the customary method in comparison with my novel method of determining these size corrections; and the same diagrammatic views as shown in the drawing will be used to illustrate both methods.

In the drawing which illustrates diagrammatically the testing of the two eyes of a patient so as to determine the necessary size correction to be prescribed for his ophthalmic lenses: Fig. 1 is a plan view showing a test for distance vision and Fig. 2 is a plan view showing a test for near vision.

The eyes indicated at $E_R$ and $E_L$ are fitted in both views with power lenses or lens systems $F_R$ and $F_L$ giving corrected vision. Size lenses or lens systems $A_R$ and $A_L$ are employed in testing for size correction for distance vision. In accordance with my novel procedure, the same lenses $A_R$ and $A_L$ would be employed in testing for size correction for near vision (Fig. 2), but in accordance with the current practice a different set of test lenses represented by lenses or lens systems $A_3$ and $A_4$ are employed in testing for size correction for near vision.

In the designing of the prescription lenses from the data obtained from the tests, the simplicity of my new method as compared with the old method becomes at once apparent. We will assume that the tests were made according to present practice for near vision, that is, that a set of test size lenses particularly designed for near vision were used in the tests, and that the ratio of $A_3$ to $A_4$ (or vice versa) is 2% greater than unity as the size error for near vision. The designer cannot from this datum assume that the prescription lenses can be arrived at by adding 2% magnification to one of the prescription lenses or by subtracting 2% magnification from one of these lenses. There are several errors for which allowance must be made. The very change in the prescription lenses which provides the size correction causes a slight error in power of the lens (or lenses) thus altered, when used for near vision. Allowance must be made for this error. On the other hand the power lenses used in the tests have affected the test results as to size, so that a correction must be made for this error. In addition there is a slight power correction because the power test lenses are not infinitely thin and close together. The various errors for which allowance must be made render it much more difficult to compute the near prescription lenses than to compute the distance prescription lenses and many errors are apt to creep in.

The determination of the size correction for near vision according to my novel method is much less complicated, since the designer uses the reading obtained by employing the size lenses (distance) $A_R$ and $A_L$ and applies this reading as a factor to one of the prescription lenses, and in his computing proceeds as though it were magnification being added to or subtracted from a distance prescription lens.

The mathematical basis for my novel procedure for determining size corrections, adopting certain of the relations derived in my Letters Patent 2,077,134 dated April 13, 1937, is as follows:

M, the total magnification for the actual distance of test, is equal to P, the power magnification, times S, the shape magnification. Or, $$S \text{ equals } \frac{M}{P}$$

Now a general equation for magnification was derived in the above identified patent application and is adopted here with the difference in nomenclature that U of that application becomes $b$ here, the total distance $d+\Sigma\tau+U$ here becomes $l$, and $d+\Sigma\tau$ here becomes $d'$, viz:

$$M = \frac{l}{Bb - Abd - D + Cd} \quad (1)$$

from which we can derive the fact that for an infinitely thin system, $$P = \frac{1}{1 - \frac{bd'}{l} \cdot De} \quad (2)$$

Then $$S = M\left(1 - \frac{bd'}{l}De\right) = \frac{M}{P} \quad (3)$$

for any system.

From the general Equation 1 we see that $$\frac{l}{M} = bB + d(C - bA) - D \quad (4)$$

which becomes $$\frac{l}{M} = (d' - \Sigma\tau)\left(\frac{1}{S'} - b\frac{De}{S'}\right) + b(S' + D.De) - D \quad (5)$$

if we substitute $(d' - \Sigma\tau)$ for $d$;

$$\frac{1}{S'} \text{ for } C; \frac{De}{S'} \text{ for } A;$$

and $S' + D.De$ for $B$.

Now from Equations 3 and 5 we derive $$\frac{1}{S} = \frac{l}{M}\frac{1}{l - bd'De} =$$

$$\frac{(d' - \Sigma\tau)\left(\frac{1}{S'} - \frac{bDe}{S'}\right) + b(S' + D.De) - D}{l - bd'De} \quad (6)$$

$$= \frac{d' - bd'De - \Sigma\tau + \Sigma\tau bDe + bS'^2 + bS'D.De - DS'}{S'\{l - bd'De\}} \quad (7)$$

which after some mathematical reduction can be written $$\frac{1}{S} = \frac{1}{S'} + \frac{1}{S'}\frac{b}{l}\frac{S'^2 - 1}{\left(1 - \frac{bd'}{l}De\right)} - \frac{(\Sigma\tau + DS')(1 - bDe)}{S'l\left(1 - \frac{bd'}{l}De\right)} \quad (10)$$

Therefore we have the ratio of the distance size magnification to near size magnification as follows:

$$\frac{S'}{S} = 1 + \frac{b}{l}\frac{S'^2 - 1}{1 - \frac{bd'}{l}De} - \frac{(\Sigma\tau + DS')}{l} \cdot \frac{1 - bDe}{1 - \frac{bd'}{l}De} \quad (11)$$

or $$\frac{S'}{S} = 1 + \frac{b}{l}(S'^2 - 1)P - \frac{\Sigma\tau + DS'}{l}\frac{P}{P'} \quad (12)$$

This important equation will be made use of later.

Now we must determine the difference in the power of a lens system for distance and near vision. The general equation for power may be written according to Pendlebury $$\frac{1}{V} = \frac{Au + B}{Cu + D} = \frac{D - Ad}{D - Cd} = \frac{\frac{A}{C}\frac{B}{Cd}}{1 - \frac{D}{Cd}} \quad (13)$$

and substituting the vertex focal power De for $\frac{A}{C}$ we find $$\frac{1}{V} = \frac{De - \frac{B}{Cd}}{1 - \frac{D}{Cd}} = De + \frac{\frac{D.De}{Cd} - \frac{B}{Cd}}{1 - \frac{D}{Cd}} = De + \frac{D.De - B}{Cd - D} \quad (14)$$

Since $$\frac{1}{V_0} = De - \frac{1}{d'} = De - \frac{1}{d + \Sigma\tau}$$

$$\Delta\frac{1}{V} = \frac{1}{V} - \frac{1}{V_0} = \frac{D.De - B}{Cd - D} + \frac{1}{d + \Sigma\tau}$$

Since $$AD = BC - 1; \frac{A}{C}D = B - \frac{1}{C} \text{ or } De.D = B - S' \quad (15)$$

we can, by considerable mathematical transformations find the following equation $$\Delta\frac{1}{V} = \frac{1}{V} - \frac{1}{V_0} = \frac{1 - S'^2}{d'} - \frac{S'^2}{d'} \times \frac{(\Sigma\tau + DS')}{1 - \Sigma\tau + DS'} \quad (18)$$

which is an exact expression for the difference in the effect on an eye of an infinitely thin lens having a given effective power for a distant object when used for a near object and such effect of a thick lens or a series of lenses having the same effective power for a distant object when this thick lens or series of lenses is used for near vision.

In Fig. 2 replace $A_3$ and $A_4$ by $A_R$ and $A_L$. Since the finite thickness of power lenses necessarily have size or shape magnification we must consider as our measured size the combined effect of all the lenses in front of the eye. However, since it is quite customary to have spherical test lenses all of the same thickness and front surface power, thus giving the same size factor due to spherical lens to each eye and therefore cancelling, we usually omit consideration of the shape or size magnification of the spherical lenses. We must correct the measured shape magnification by the shape magnification introduced by the cylinder lens due to its position, thickness, and surface forms. Of course, if a trial set is designed with the order of lenses reversed, the corrections may be for the sphere.

We will examine the Equations 12 and 18 which express the relations between S and S' and between $$\frac{1}{V} \text{ and } \frac{1}{V_0}$$

to determine what errors are introduced into the computations of the curves for the prescription lenses by employing distance size lenses for the near size tests in accordance with my invention. Discussing first the significance of the terms in Equation 18, the first term $$\frac{1 - S'^2}{d'}$$

involves $d'$ and $S'$. For the customary reading distance $d'=0.4$ m., or 400 mm. Also, if we substitute $1+\Delta S'$ for $S'$ then $1-S'^2$ becomes $5\Delta S'$ approximately, which is appreciable. For instance if $\Delta S'=0.02=2\%$, then this term is 0.10 diopter; but it was present in the test system just as it occurs in the prescription lens, so that its effect disappears. When $S'$ is increased for design convenience of the prescription lens, a small change in power will be produced of vanishing importance.

There is one precaution which must be taken because there is one case in which the difference arising out of the term $$\frac{1-S'^2}{d'}$$

is serious. Sometimes in translation of prescriptions a considerable meridional magnification is, for convenience, added to one or both eyes. In that case, we known that an astigmatic error would be introduced to the extent of 0.05 diopter per percent of shape magnification added, and this error should be compensated in designing the power of the lens.

Upon analysis of the second term, again adopting 0.4 m. as a standard for the reading distance $d'$ $$\frac{(S')^2}{d'}\left\{\frac{\Sigma\tau+D.S'}{1-\frac{\Sigma\tau+D.S'}{d'}}\right\}=2.5\times\tfrac{1}{3}\text{ glass thickness}$$

(index 1.5). For a glass thickness of 10 mm. this is $$2.5\times\frac{0.010}{3}$$

or 0.01D which can be neglected. We thus find that the errors, as to power, which occurred in the test lenses due to their use for near vision, are counteracted by the occurrence of the same errors in the designing of the near prescription lenses on the basis of distance vision. The procedure is accurate as to power except in certain transfers of size from one eye to the other, and here the above mentioned precautions must be taken, especially with meridional size transfer.

Discussing now the significance of the terms in Equation 12, the first term is $$\frac{b}{l}(S'^2-1)P$$

and if we substitute 0.020 m. for $b$; $d'+b$ for $l$; and $1+\Delta S'$ for $S'$ then this term becomes $$\frac{0.020}{d'+0.020}(1+2\Delta S'+\overline{\Delta S'^2}-1)P$$

and since $d'$ is assumed to be 0.4 m. and $$\overline{\Delta S'^2}$$

is so small it can be neglected, $$\frac{b}{l}(S'^2-1)P=\frac{0.02\times 2\Delta S'\times P}{0.42}=$$

$$\frac{0.04}{0.42}\times\Delta S'\times P=\frac{1}{10}\Delta S'P$$

While this looks like a large term, it disappears because it is the same in the test lenses as in the prescription lenses, with the proviso that the precaution above referred to must be taken in case a considerable meridional magnification has been added to one or both eyes in the translation of the prescription.

If one desires to know the absolute value for the near shape magnification for purposes of study, a simple table will give it; but otherwise such knowledge is of no value; and will not be used in the usual course of designing prescription lenses in accordance with my invention.

The next term in the ratio $$\frac{S'}{S}$$

is the important one for comparing the test results with the prescription. The term as expressed in Equation 12 is $$\frac{\Sigma\tau+DS'}{l}\cdot\frac{P}{P'}$$

Now $\Sigma\tau+DS'$ is approximately equal to $$\Sigma\tau\left(1-\frac{1}{\mu}\right)$$

This approximation is to and excluding the squares of a thickness multiplied by the first power of a surface. But more exactly, the expression for $\Sigma\tau+DS'$ for six surfaces to and excluding the cubes of the thickness by the square of the surface powers is $$^5\Sigma_1\tau_n\left(1-\frac{1}{\mu_n}\right)-\rho_1(t_1+t_2+t_3+t_4+t_5)^2 \quad (19)$$
$$-\rho_2(t_2+t_3+t_4+t_5)^2$$
$$-\rho_3(t_3+t_4+t_5)^2$$
$$-\rho_4(t_4+t_5)^2$$
$$-\rho_5 t_5^2$$

and to obtain the term of Equation 12 which we are now considering we must multiply this expression by $$\frac{1.P}{l.P'}$$

We will first consider $$\Sigma\tau\left(1-\frac{1}{\mu}\right)\frac{1}{l}\cdot\frac{P}{P'}$$

and since $$\frac{1}{l}=2.5$$

and $\mu$ is about equal to 1.5 this product becomes $$0.8\Sigma\tau\frac{P}{P'}$$

But $$\frac{P}{P'}$$

is nearly unity and is identical in the test and prescription. Therefore, differences in glass thickness must be compensated for to the extent of 0.08% per millimeter glass thickness difference or 1% per 12 millimeters.

If the glass thickness difference between the two eyes is the same when the test lenses are in front of the two eyes as when the prescription lenses are so placed, then the effect of the first term of Equation 19 vanishes but if this difference is not the same then a proper compensation must be made as has been shown.

The second term is the product of a surface power by a reduced thickness. If we assume a very extreme case, a prescription lens with a front surface power of +20D and a thickness of 6 mm. or a reduced thickness of 0.004 meter, we have a value of shape magnification of about 8.7%, a very large value, then this last term is $-20\times(0.004)^2\times 2.5$ which is 0.08% a value too small to consider when the shape magnification is more than 8%.

However, the test lenses are positioned considerably in front of the ocular surface plane, and in consequence, either a balance made by designing an uncompensated thickness difference with this last term, or a tabulation of the error must be made. The balance can be made for the lens since the thickness term is opposite in sign to the position term, if the surface is positive, i. e., $$\frac{P}{eP'}\left\{\Sigma\tau\left(\frac{\mu-1}{\mu}\right)-\rho_1(\Sigma_1{}^n t)^2-\rho_2(\Sigma_2{}^n t)^2 \text{etc.}\right\} \quad (20)$$

Let us take an ordinary case with a 2% size lens placed directly in front of the cylinder test lens. We would have the cylinder 4½ mm. from the sphere, the overall size lens 4½ mm. from the cylinder, a total of 9 mm. of air plus glass or for the designed thickness of this lens a reduced distance of 8 mm. The spherical 2% size lens might have a thickness of 3 mm. (reduced thickness 2 mm.) with roughly a +10D curve on the front and a −10D on the other side. The power term is then $$2.5\{-10(0.010)^2+10(0.008)^2\}=-0.09\%$$

Obviously this must be added to the first term which as has been shown is 0.08% per millimeter of glass thickness or $$3\times 0.08\% - 0.09\% = +0.15\%$$

when a compensating plate is not used in front of the other eye. This is too large to neglect since magnification is usually determined in steps of ¼% but the −0.09% is only one third of the smallest step used in testing.

Obviously then the thickness difference between the two eyes is the more important part of the correction and therefore if we put a meridional size difference lens in front of one eye and an overall size difference lens in front of the other eye both of approximately the same thickness then we compensate well the difference for all ordinary corrections which only infrequently exceed 2% in shape magnification difference. Likewise we have to place a zero power (plano) compensating lens in the cylinder cell opposite the eye which has a true cylinder in order to compensate for the thickness of the cylinder lens. If there is a cylinder in both eyes the compensating cylinder lens may be omitted.

Some desire to have both meridional and overall size differences in one eye alone. In this case a compensating lens must be placed in front of the other eye.

The equations of the ratio of near to distance shape magnification also contain the term as a factor $$\frac{P}{P'}$$

This has been considered as unity in all the discussion here given as its value, as given in the algebraic equations, is so near unity when numerical values are substituted that it is of no importance for ophthalmic lenses although for some optical systems of widely separated lenses it may have a slight effect.

From this discussion of the ratio of distance shape magnification to near shape magnification it is clearly seen that for all ordinary magnifications we can use a distance series of shape magnification lenses and focal power test lenses for near vision tests; then design the prescription lenses for distance vision, and use them for near provided we compensate for the difference in glass thickness in front of the eyes. The easiest way to do this is to make all power test lenses the same thickness, all shape magnification lenses the same thickness, whether zero in distant effect or not, and always have companion lenses in front of the eyes so that the total glass thickness remains the same. In the prescription lens, for reasons of weight it may be desirable to change this thickness in front of one eye. This is easily done by compensating for the effect of this thickness as previously given.

For exceptionally large values of the shape magnification, it is necessary to correct the measured values by the last terms in the equation of the ratio of distance to near shape magnification. These can easily be tabulated where necessary but this occurs very seldom.

The system of test lenses both for focal power and shape magnification are designed to have zero i. e. plano compensating lenses. The spherical power lens has a companion spherical power lens in front of both eyes, each of the same thickness, so far this is common practice in the best trial sets for testing for focal power. The cylinder trial lens has a companion lens in front of both eyes of the same thickness whether of real focal power or zero focal power, this has not been done in focal power test sets heretofore. The overall shape magnification lens has a companion lens of the same thickness in front of both eyes. The meridional size lens has a companion in front of each eye. However, it is simpler to make the meridional and overall shape magnification lenses both of the same thickness, then they may be used as companions for each other, a meridional shape magnification in front of one eye and an overall shape magnification lens in front of the other eye. Whether this is done or companion zero shape magnification (i. e. plano) lenses are used depends upon the desire of the person doing the testing.

My invention simplifies the determination of the proper lenses to be worn for correction of the ratio of size impressions. The use of the same test lens systems both for near and for distance tests simplifies both the work of testing and the designing of the prescription lenses, as has been above explained. This will, in general, work toward more accurate results.

I claim:

1. A method of providing prescription lens systems for near vision correction of the eyes of a patient comprising exposing test means to the vision of the patient's eyes at a distance approximate for a test for near vision, placing refractive test lens systems designed for an object at infinity in front of the patient's eyes, varying the powers of said refractive test lens systems so as to determine in conjunction with said exposed test means the required correction for the refractive errors of the eyes, placing additional test lens systems before the eyes which are designed to introduce shape magnification without change of focal power for an object at infinity to vary the ratio of size impressions existing between the two eyes by an amount to equalize said size impressions so as to determine the inequality of such ratio between the two eyes, noting the difference of the total center thicknesses of the test lens systems before the two eyes, computing the design for the required surface curvatures for prescriptive lens systems for near vision corrections, according to the findings by said test lens systems, as though being designed for an object at infinity while substantially effectively maintaining the difference of the total center thicknesses of the test lens systems before the two eyes and surfacing pieces of lens medium with surface curvatures to produce prescriptive lenses for near vision, according to the design thus computed, while reducing said prescriptive lenses to total center thicknesses which are different from each other substantially equal to the difference of the total center thicknesses of the test lens systems.

2. A method of providing prescription lens systems for near vision correction of the eyes of a patient comprising exposing test means to the vision of the patient's eyes at a distance approximate for a test for near vision, placing refractive test lens systems designed for an object at infinity in front of the patient's eyes, varying the powers of said refractive test lens systems so as to determine in conjunction with said exposed test means the required correction for the refractive errors of the eyes, equalizing the center thicknesses of said respective test lenses by the insertion, before each eye, of lens systems having substantially the same center thicknesses and which embody the result of said refractive test, placing test lens systems before the eyes which are designed to introduce shape magnification without change of focal power for an object at infinity to vary the ratio of size impressions existing between the two eyes by an amount to equalize said size impressions so as to determine the inequality of such ratio between the two eyes, computing the design for the required surface curvatures for prescriptive lens systems for near vision corrections, according to the findings by said test lens systems, as though being designed for an object at infinity while substantially effectively maintaining the relation of the total center thicknesses of the selected test lens systems to each other and surfacing pieces of lens medium with surface curvatures to produce prescriptive lenses for near vision, according to the design thus computed, while reducing said prescriptive lenses to the total center thicknesses which have substantially the same relation to each other as do the total center thicknesses of the selected test lens systems.

3. A focal power test lens set for use with size testing lenses in testing the errors of the eyes, said test lens set comprising a series of spherical power test lenses and a series of cylindrical power test lenses, one of which is to be used adjacent the eye and the other away from the eye, all of the lenses of said respective series being formed of lens medium of sensibly the same index of refraction and the lenses of each of said series being arranged in progressive steps of different focal powers, all of the lenses of the series for use adjacent the eye being formed to the same center thickness and each having the same front optical surface curvature, said latter lens series having embodied therein plano focal power lenses of the same center thickness and front surface curvature as the remaining power lenses of said series to be used next to the eye when there is no power lens of that series required in the correction, and the series of lenses to be used away from the eye having embodied therein a corresponding plano lens of the same thickness as a correlated lens of said series, whereby the power of the series away from the eye may be correctly transferred to the ocular surface next to the eye and the total center thickness of the lens system in front of both eyes maintained the same so that there will be no introduction of size resulting from difference in said center thicknesses.

4. The method of making a focal power test lens set for use with size testing lenses for testing the errors of the eyes comprising forming a series of spherical power test lenses and a series of cylindrical power test lenses, one of which is to be used adjacent the eye and the other away from the eye, with the lenses of each of said series formed of lens medium of substantially the same index of refraction and arranged in progressive steps of different focal powers, forming all of the lenses of the series for use adjacent the eye with the same center thickness and with the same front optical surface curvature, providing said latter lens series with plano focal power lenses of the same center thickness and front surface curvature as the remaining power lenses of said series to be used adjacent the eye for use when there is no power lens of that series required, and providing in the lens series to be used away from the eye, a corresponding plano lens of the same thickness as a correlated lens of said series, whereby the power of the series away from the eye may be correctly transferred to the ocular surface adjacent the eye and the total center thickness of the lens system in front of both eyes maintained the same so that there will be no introduction of size by difference in said center thicknesses.

EDGAR D. TILLYER.